United States Patent [19]
Jäger

[11] Patent Number: 4,721,497
[45] Date of Patent: Jan. 26, 1988

[54] CONNECTOR FOR BELT-LIKE MEMBERS THAT ARE SUBJECTED TO TENSION

[75] Inventor: Andreas Jäger, Burgdorf, Fed. Rep. of Germany

[73] Assignee: Arnold Jäger, Fed. Rep. of Germany

[21] Appl. No.: 911,104

[22] Filed: Sep. 24, 1986

[30] Foreign Application Priority Data

Sep. 24, 1985 [DE] Fed. Rep. of Germany ....... 3533932
Aug. 22, 1986 [DE] Fed. Rep. of Germany ....... 3628616

[51] Int. Cl.$^4$ .................................. F16G 11/02
[52] U.S. Cl. ........................................ 474/255; 24/37
[58] Field of Search ............... 474/253, 255, 256, 257; 24/31 H, 37, 38, 31 C, 31 R

[56] References Cited

U.S. PATENT DOCUMENTS

| | | | |
|---|---|---|---|
| 1,570,801 | 1/1926 | Vollrath | 24/37 |
| 2,178,558 | 11/1939 | Cady | 474/257 |
| 2,477,855 | 8/1949 | Beach | 24/37 |
| 4,558,492 | 12/1985 | Hite et al. | 24/37 |
| 4,582,505 | 4/1986 | Stolz | 474/255 |

Primary Examiner—Stephen J. Novosad
Assistant Examiner—Thuy M. Bui
Attorney, Agent, or Firm—Becker & Becker, Inc.

[57] ABSTRACT

A connector for rotating belt-like members that are subjected to tension. The belt-like members are provided with reinforcements that form a unit. Furthermore, the members are made essentially of rubber or rubberlike materials, and have two ends. Two U-shaped fittings that are interconnected in an articulated manner are provided, with each fitting being provided with two legs having surfaces that face one another. In the mounted state, a given one of the ends of a belt-like member is disposed between the facing surfaces of the legs of a given fitting, whereby the fitting is secured to the belt-like member via fasteners. The facing surfaces of the legs are each furthermore provided with projections that extend transverse to the direction in which the member rotates. One of the projections of a given one of the legs is disposed across from the space between two projections of the facing leg. In a mounted state, the thickness of the belt-like member is such, and the distance between facing surfaces of the legs is such, that the unit is deformed in a wavelike manner in conformity to the configuration of the legs.

4 Claims, 3 Drawing Figures

U.S. Patent   Jan. 26, 1988   4,721,497
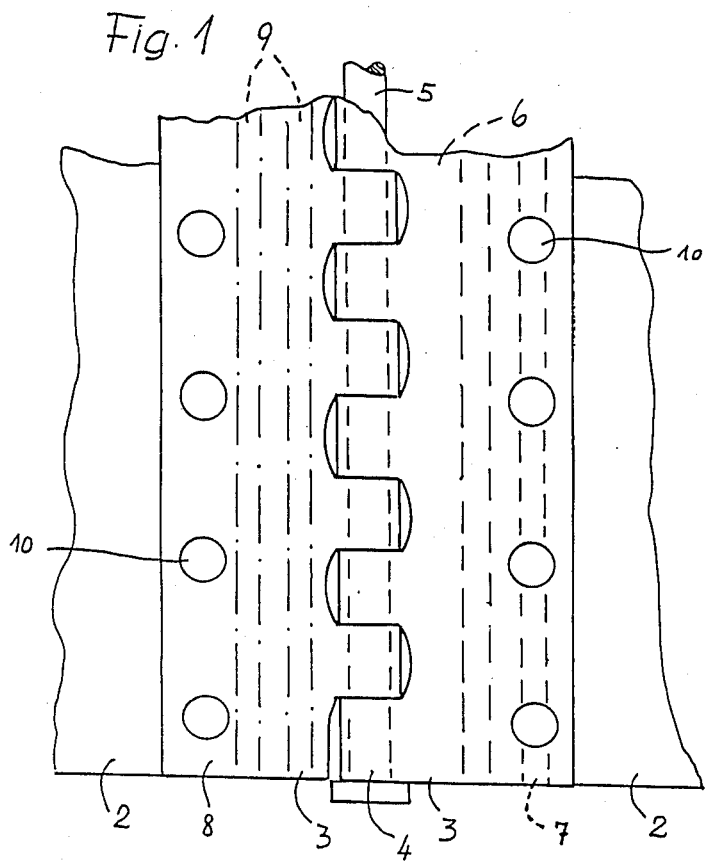
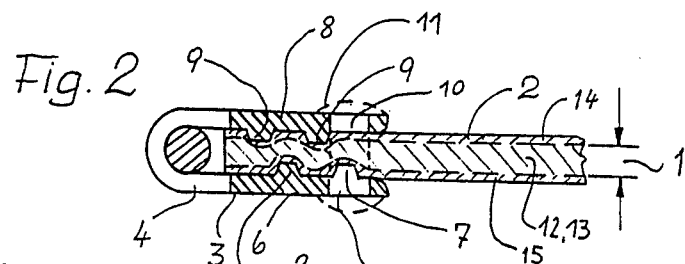
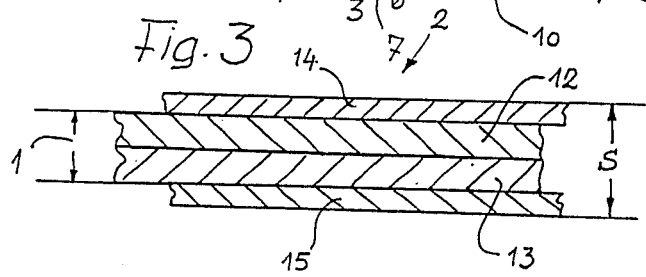

CONNECTOR FOR BELT-LIKE MEMBERS THAT ARE SUBJECTED TO TENSION

BACKGROUND OF THE INVENTION

Field of the Invention

The present invention relates to a connector for rotating belt-like members, especially drive belts, tracks, and other belts and bands for the operation of vehicles, especially snowmobiles, that are subjected to tension. The belt-like members are provided with reinforcement means, are made essentially of rubber or rubberlike materials, and have two ends. U-shaped fittings, which are interconnected in an articulated manner by a transverse rod, enclose the ends of a belt-like member to interconnect these ends, with screws or the like passing through the legs of the fittings as well as through the ends of the belt-like member.

An object of the present invention is to improve connectors of this general type in such a way that they can transmit high tensile forces without there being any danger that the aforementioned screws or the like will be torn out.

BRIEF DESCRIPTION OF THE DRAWING

This object, and other objects and advantages of the present invention, will appear more clearly from the following specification in conjunction with the accompanying schematic drawing, in which:

FIG. 1 is a partial plan view of one inventive embodiment of a fastening connector of a drive belt or track for a snowmobile, whereby this belt-like member can be provided with transversely extending drive or gripping elements for engaging the snow;

FIG. 2 is a cross-sectional view through one end of a belt-like member and the fitting secured thereto; and FIG. 3 is a partial longitudinal cross-sectional view through a belt-like member used with the inventive connector.

SUMMARY OF THE INVENTION

The connector of the present invention is characterized primarily in that the facing surfaces of the legs of a fitting are provided with projections that extend transverse to the direction of rotation of the belt-like member, with one projection of a given one of the legs being disposed between two projections of the other leg, and, in the mounted state, with the unit formed by the reinforcement means of the belt-like member having a wavelike shape that corresponds to the configuration of the projections.

Preferably, on one side of the belt-like member only one projection is provided, and on the other side of the member two projections are then symmetrically arranged relative to this single projection. The projections are advantageously embodied in a rib-like fashion, and are provided with a rounded-off crest in order to be able to achieve a wavelike configuration of the reinforcement-means-unit of the belt-like member by clamping and pressure.

It has been shown that such inventive connectors for belt-like members can transmit very high forces. Surprisingly, during tests the first thing to break was the point of connection between the U-shaped fittings; it could therefor not be determined at what point the fittings might tear off from the ends of a belt-like member.

In order to permit the belt-like members to be able to run over guide and drive pulleys having a relatively small diameter without having to fear premature destruction of the connector that interconnects the ends of the belt-like member, it is furthermore inventively proposed that at least a portion, and preferably either the greatest portion or even all, of the projections be disposed between a screw that is proximate to the transverse rod on the one hand, and the transverse rod on the other hand. An additional projection is preferably also provided in alignment with the aforementioned screws, with this projection being intermittently interrupted by holes provided for the screws.

Accordingly, it is possible to dispose the projections along a narrow space and to eliminate a second row of screws. Therefore, the length of the connection location is extended only slightly, thus making it possible for the belt-like members to rotate about small pulleys and the like.

Further specific features of the present invention will be described in detail subsequently.

DESCRIPTION OF PREFERRED EMBODIMENTS

Referring now to the drawing in detail, the belt-like member 2 is essentially made of rubber or the like, and includes a reinforcement in the form of a unit 1 of textile fabric or the like. The belt-like member 2 is pull resistant or inextensible, and one outer side of the member 2 is provided with driving or gripping elements. Each of the two ends of the belt-like member 2 is enclosed by a U-shaped fitting 3 of steel or the like. The two fittings 3 extend into one another in a tooth-like fashion, with a rod 5 extending through the front region 4 of each fitting 3 where the belt-like member 2 is not present. The rod 5 interconnects the two fittings 3 in a hinge-like or articulated manner in order to effect interlocking of the two ends of the belt-like member 2. However, this interlocking can also be effected in other ways, with the present invention predominantly relating to the anchoring of the fittings 3 to the ends of the belt-like member 2.

The lower leg 6 of each fitting is provided with two ridge-like projections 7 each having an approximately trapezoidal cross-sectional shape. One of the projections 7 is disposed approximately half way along the leg 6, while the other projection 7 is disposed between the first projection and the free end of the leg. The upper leg 8 of the fitting 3 is similarly provided with two trapezoidal, ridge-like projections 9. The two projections 7 and the two projections 9 are in each case disposed the same distance from one another. However, the two pairs of projections are respectively offset relative to one another in such a way that one of the projections of a given one of the legs is always disposed between two projections of the other leg, and in particular is disposed half way between these two projections. Furthermore, that projection 7 of the leg 6 proximate to the end thereof is not embodied as a continuous ridge, but rather is interrupted at regular intervals by holes 10 that extend all the way through the leg. These holes 10 serve to receive screws or rivets (indicated by dashed lines at the reference numeral 11) that also extend through the belt-like member 2.

Via the screws or rivets, and under the influence of the two legs 6,8 of the fitting 3, the belt-like member 2 is deformed, and in particular in such a way that the unit 1 assumes a wavelike configuration. This occurs under considerable pressure effect; however, the structure of the belt-like member is maintained. Due to this clamping of the ends of the belt-like member, and especially due to the wavelike configuration of the unit 1, the fittings 3 can transmit considerable tensile forces. The important thing is that the means for holding the two legs 6,8 together be disposed at the end of the legs, and the important projections 7,9 be disposed between the holes 10 and the zone for receiving the rod 5. In order to save space, one of the projections 7 is disposed in the region of the holes 10.

The belt-like member of FIG. 3 has a thickness S that is slightly greater than the distance between the two legs 6,8 of one of the fittings 3. In the illustrated embodiment, the unit 1 is formed by two plies 12,13 that are securely vulcanized together, and comprise rubberized fabric. The outwardly disposed cover layers 14, 15 are comprised of rubber. If one assumes a thickness S of 10 mm, the two cover layers 14,15 would have a thickness of approximately 2.5 mm, while the unit 1 would have a thickness of approximately 5 mm. Thus, each of the cover layers 14, 15 would comprise approximately $\frac{1}{4}$ of the thickness S of the belt-like member, while the unit 1 would comprise approximately $\frac{1}{2}$ of the thickness S of the belt-like member. This configuration provides, on the one hand, sufficient strength, whereas on the other hand the clamping possibilities between the legs 6,8 of a fitting 3 are still great enough that a high resistance to being torn out can be achieved due to the wavelike configuration.

It should be noted that on the left side of FIG. 1, the projections 9 of that fitting 3 are shown by dot dash lines, whereas on the right side of FIG. 1 the projections 7 of that fitting 3 are shown by dashed lines.

The distance between the projections of a given one of the legs 6,8 should be approximately 3/2 of the distance between the legs 6,8 (when viewed in the parallel orientation of FIG. 2). In contrast, the height of the projections 7,9 should be approximately $\frac{1}{4}$ to $\frac{1}{3}$ of the distance between the legs 6,8.

The present invention is, of course, in no way restricted to the specific disclosure of the specification and drawing, but also encompasses any modifications within the scope of the appended claims.

What I claim is:

1. A connector for connecting the two ends of a rotating belt-like member that is subjected to tension; the belt-like member is provided with reinforcement means, and is essentially made of rubber or rubber-like materials; said connector comprising:

two U-shaped fittings that are interconnected in an articulated manner, each of said fittings being provided with two legs having surfaces that face one another, with a given one of said ends of said belt-like member, in the mounted state, being disposed between said facing surfaces of said legs of a given one of said fittings, whereby said fitting is secured to said belt-like member via fastening means; said facing surfaces of said legs are each furthermore provided with projection means that extend transverse to the direction in which said belt-like member rotates, with one of said projection means of a given one of said legs being disposed across from the space between two projection means of the facing leg; the thickness of said belt-like member is such, and the distance between said facing surfaces of said legs is such, that in the mounted state said reinforcement means is deformed in a wavelike manner in conformity to the configuration of said projection means; transverse rod means for effecting said interconnection of said fittings, with at least a portion of said projection means of a given one of said fittings being disposed between said fastening means and said transverse rod means, the greatest portion of said projection means of a given one of said fittings being disposed between said fastening means and said transverse rod means, the distance between successive ones of said projection means on a given one of said legs being approximately 3/2 of the distance between said facing surfaces of said legs, and the height of said projection means measured from said facing surfaces of said legs being approximately $\frac{1}{4}$ to $\frac{1}{3}$ of said distance between said facing surfaces; said belt-like member further comprising said reinforcement means in the form of a unit of rubberized fabric plies, and two respective rubber-like cover layers on opposite sides of said unit, with said cover layers each comprising about $\frac{1}{4}$ of the total thickness of said belt-like member, and said unit comprising about $\frac{1}{2}$ of said total thickness.

2. A connector according to claim 1, in which all of said projection means of a given one of said fittings are disposed between said fastening means and said transverse rod means.

3. A connector according to claim 1, in which ones of said projection means are between successive ones of said fastening means when viewed in the direction transverse to the direction in which said belt-like member rotates.

4. A connector according to claim 1, in which each of said projection means is in the form of a ridge-like projection disposed on a given one of said legs, and has an approximately trapezoidal cross-sectional shape.

* * * * *